No. 850,517. PATENTED APR. 16, 1907.
J. BROOME.
ACID CONDENSER.
APPLICATION FILED FEB. 20, 1906.
2 SHEETS—SHEET 1.
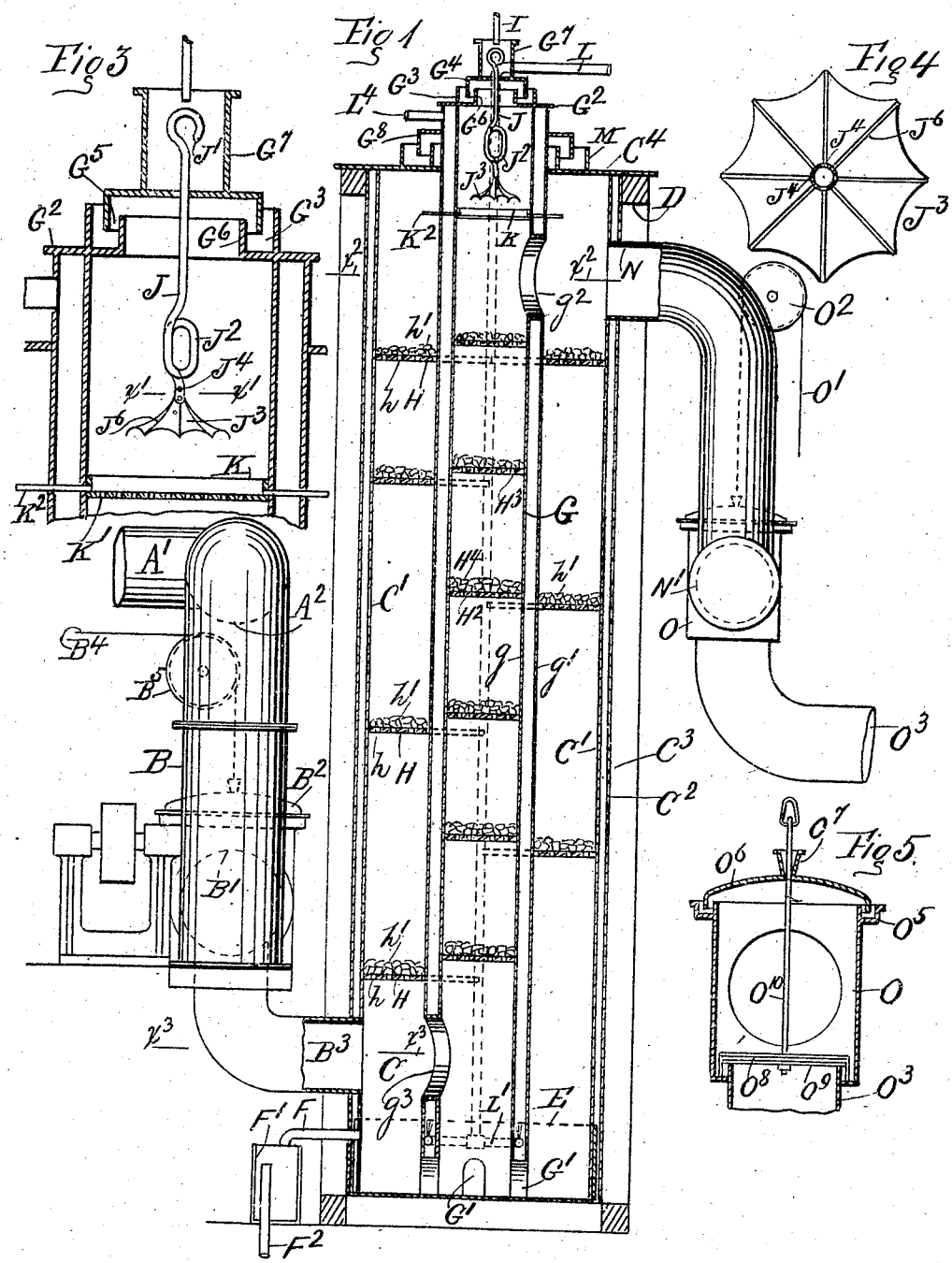

No. 850,517. PATENTED APR. 16, 1907.
J. BROOME.
ACID CONDENSER.
APPLICATION FILED FEB. 20, 1906.
2 SHEETS—SHEET 2.
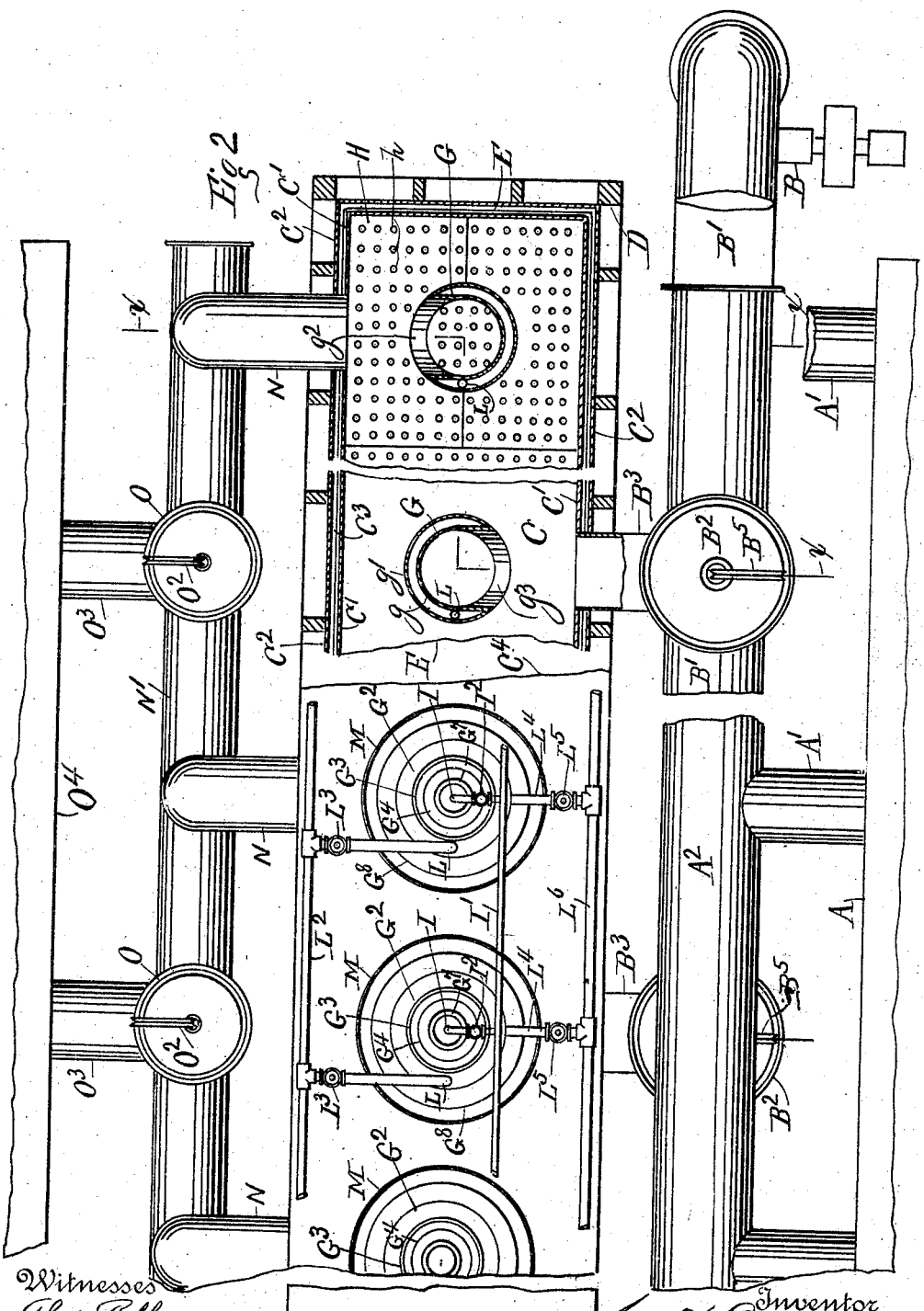

UNITED STATES PATENT OFFICE.

JOSEPH BROOME, OF BAYONNE, NEW JERSEY.

ACID-CONDENSER.

No. 850,517.      Specification of Letters Patent.      Patented April 16, 1907.

Application filed February 20, 1906. Serial No. 301,999.

*To all whom it may concern:*

Be it known that I, JOSEPH BROOME, a subject of Great Britain, and a resident of Bayonne, in the county of Hudson and State of New Jersey, have invented a certain new and useful Acid-Condenser, of which the following is a specification.

This invention relates to an acid-condenser; and its object is the production of a condenser the essential elements of which are a tower, water-jacketed columns therein, intermittent siphons connected with the columns, and means to split the gases handled in the apparatus to finely divide the same in the process of condensation.

In the drawings, Figure 1 shows a partial section of Fig. 2, as on the line $x\ x$. Fig. 2 represents a partial top view of the invention with sections, as on the lines $x^2\ x^2$ and $x^3\ x^3$ of Fig. 1. Fig. 3 is an enlarged view of the upper portion of Fig. 1. Fig. 4 shows a partial enlarged section of Fig. 3 on the line $x'\ x'$. Fig. 5 is a partial enlarged vertical section of a jug-damper used with the invention.

A chamber is shown at A, from which extend the conduits A', that connect with the top inlet-header $A^2$, which latter is joined with the blower B. From the blower extends the lower inlet-header B', which has connected therewith the inlet jug-dampers $B^2$, and from the latter extend the inlet-pipes $B^3$, that enter the tower C of the condenser. The jug-dampers are operated by the chains $B^4$, that pass over the sheaves $B^5$.

The tower C is composed of the inner walls C' and outer walls $C^2$, generally of lead, with a space $C^3$ between them, and the said walls are supported in the framing D, generally made of wood, connected with the lower ends of the walls in the box-shaped bottom E, with its vertical walls located in the spaces $C^3$. An outlet-nozzle F extends from the bottom E, through the wall C' $C^2$, and leads to a receptacle F' with an outlet-pipe $F^2$.

Water-cooled columns G are located in the tower, and division-plates H, having perforations and made of lead, porcelain, glass, or other material not attached by the acid to be produced, extend from the walls of the tower to the outer surfaces of the said columns, each plate encircling one-half of the column to which it is adjacent. The plates are on different levels, so as not to be opposite to each other, except the upper two, as shown in Fig. 1, and each division-plate is covered with pieces of quartz $h'$ and the like. On the nside of each column are also located division-plates $H^2$ with perforations $H^3$, and upon the plates are placed pieces of quartz $H^3$ or pieces of similar material not attached by the acid-vapors to be condensed.

Each column G is made with an inner wall $g$ and an outer wall $g'$, which rest in the bottom E, openings G' connecting the inside of each column at its lower end with the inside of the tower. Openings $g^2$ and $g^3$ lead from the inside of the columns to the tower. The top of each column has fitted thereto the cover $G^2$, in which is constructed a liquid-sealed opening, comprising the annular cup $G^3$, into which extends the inverted cup $G^4$, the latter being held in place by lugs or arms $G^5$, connecting with the barrel $G^6$ of the cup $G^3$. From the inverted cups $G^4$ extends the receptacles $G^7$, into which lead the pipes I, that extend from the piping I' with the valves $I^2$.

Supported in the covers of the inverted cups $G^4$ are the siphons J, with the inverted inlet-nozzles J', loops $J^2$, and distributing-hoods $J^3$, openings $J^4$ being inserted in the tube extending below the loop $J^2$ over the hood $J^3$. The said hoods are made umbrella-shaped and are composed of curved segments which at their junctions form gutters $J^6$. Below the hoods $J^3$ are located in each column a spray-plate K with perforations K', and a pipe $K^2$ extends from each spring-plate and leads to the tower C. Entering through the covers $G^2$ of the columns are the inlet-pipes L, which extend between the walls $g$ and $g'$ of the said columns to the lower portions thereof, where they connect with the spray-pipes L'. Piping $L^2$ with valves $L^3$ connect with the pipes L. Extending from the upper portions the columns are the outlet-pipes $L^4$ with valves $L^5$, connecting with the piping $L^6$.

The cover $C^4$ of the tower has connected therewith for each column a liquid-sealed opening for the insertion of the said columns G. It comprises the annular cup M, extending from the said cover $C^4$, into which extends the inverted cup $G^8$, extending from the outer wall of the column G. From the upper portion of the tower and connecting with the walls C' C² thereof are the outlet-pipes N, that connect with the outlet-header N', which latter have connected therewith the jug-dampers O. The latter are operated by the chains O' over the sheaves O². The said dampers lead to the outlet-conduits O³, that enter the chamber O⁴.

The jug-dampers are all similar to the construction shown in Fig. 5, in which the body thereof is represented at O, with the annular gutter O⁵ at its upper edge, into which enters the cover O⁶ with the stuffing-box O⁷. The damper O⁸ is made of an iron disk covered with lead O⁶ and the like, and it rests on the edge of the outlet-conduit O³. A spindle O¹⁰ extends from the damper O⁸ and passes through the stuffing-box O⁷.

To operate the invention, the gases that are to be condensed are led from the chamber A and enter the inlet-conduits A' and inlet-header A². They are then drawn from the latter by means of the blower B and forced into the inlet-header B', where they pass through the jug-dampers B² into the inlet-pipes B³ and from the latter into the tower C and into the column G. The gases then rise, pass through the perforations h of the plates H and through the perforations K' of the plates K. They then also pass through the interstices between the pieces of quartz h' on the said plates, and finally such portions as are not condensed enter the outlet-conduits N and by way of the jug-dampers enter the outlet-header N'. From the latter they enter the outlet-pipes O³ and then into the chamber O⁴, after which they can be treated in a similar apparatus. Water is sprayed from the spray-pipes L', which condenses a good portion of the gases in the columns and tower. The condensed acid is collected in the bottom E of the tower, from which it is taken by means of the nozzle F, receptacle F', and outlet-pipe F². By means of the piping I acid or water can be introduced into the apparatus, thereby producing a spraying condensing apparatus in addition to the condensation produced by the water-jacketed columns. The liquid introduced by means of the pipes I enter the siphon, and when the loop J² of the latter are filled their contents are discharged, producing intermittent effects, which increases the efficiency of the device. The liquid charged into the apparatus by the siphon and its appurtenances coat upon the surfaces of the pieces of quartz in the columns, mixes with the gases to be condensed, assists in their condensation, and allows a product to be produced of a predetermined density. By means of the blower the gases are kept under pressure, helping condensation and splitting the gases, and the jug-dampers allow the adjustment of the pressure required. The columns G are detachable, so as to be easily repaired. The blower and siphon could be omitted. Steam could be forced through the pipes L L', &c., for reheating gases in the tower C instead of condensing them.

Having described my invention, I claim—

1. In an acid-condenser the combination of a tower, a column therein with an inner and an outer wall, and having an opening at its upper portion, and an opening at its lower portion through its walls, the said openings connecting the inside of the column with the inside of the tower, inlet-piping connected with the tower, means to force a vapor through the inlet-opening into the tower and column, outlet-piping extending from the tower, perforated division-plates in the tower, and in the column, a spray-pipe between the walls of the column, means to conduct a fluid through the spray-pipe, an outlet-pipe extending from the space between the walls of the column, a siphon supported in the top of the column, a loop connected with the siphon, a tube extending below the loop with openings, means to lead a liquid through the siphon and the openings in the tube, and perforated division-plates in the column.

2. In an acid-condenser the combination of a tower, a column therein with an inner and an outer wall and having an opening at its upper portion, and an opening at its lower portion and through its walls, the said openings connecting the inside of the column with the inside of the tower, inlet-piping connected with the tower means to force a vapor through the inlet-opening into the tower and column, outlet-piping extending from the tower, perforated division-plates in the tower, and in the column, a spray-pipe between the walls of the column, means to conduct a fluid through the spray-pipe, an outlet-pipe extending from the space between the walls of the column, a siphon supported in the top of the column, a loop connected with the siphon, a tube extending below the loop with openings, an umbrella-shaped hood extending below the tube, means to lead a liquid through the siphon and the openings in the tube, and perforated division-plates in the column.

3. In an acid-condenser the combination of a tower, a column therein with an inner and an outer wall, and having an opening at its upper portion and an opening at its lower portion and through both of the walls, a cover on the column, a liquid-sealed opening in the cover, a cover on the chamber having a liquid-sealed opening for the column, an inverted cup over the liquid-sealed opening of the column, a receptacle extending from said inverted cup, a pipe leading to the cup, a siphon with an inverted nozzle in the cup, the siphon extending through the cover of the column, a loop extending from the siphon, a tube extending below the loop having openings, an umbrella-shaped hood extending below the tube, means to force a vapor through the tower and column, means to spray a fluid between the walls of the column, an outlet-pipe connected with the space between the walls of the column, means to force a fluid through the tower and column, and means to lead a condensed fluid from the tower and column.

Signed at the borough of Manhattan, city of New York, in the county of New York and State of New York, this 7th day of February, A. D. 1906.

JOSEPH BROOME.

Witnesses:
 ALEX. ROBB,
 A. A. DE BONNEVILLE.